April 19, 1932.  W. G. MAYER  1,854,711

TRUCK BODY

Filed June 11, 1930  2 Sheets-Sheet 1

WITNESSES
A. B. Wallace.
E. O. Johns

INVENTOR
William G. Mayer
By Brown & Critchlow
Attorneys.

April 19, 1932. W. G. MAYER 1,854,711
TRUCK BODY
Filed June 11, 1930 2 Sheets-Sheet 2
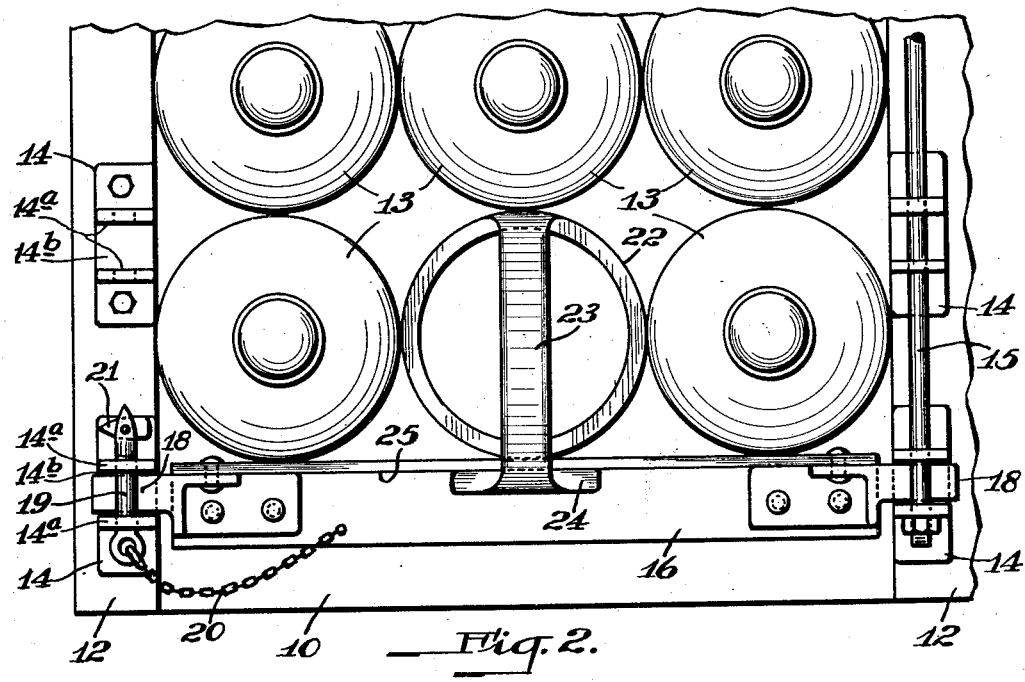
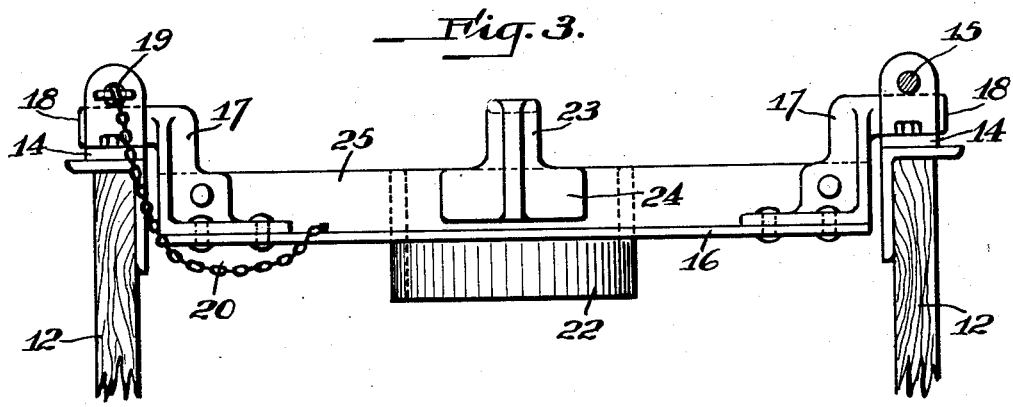
WITNESSES
AB Wallace
E. O. Johns
INVENTOR
William G. Mayer
By Brown & Critchlow
Attorney Patented Apr. 19, 1932

1,854,711

UNITED STATES PATENT OFFICE

WILLIAM G. MAYER, OF PITTSBURGH, PENNSYLVANIA

TRUCK BODY

Application filed June 11, 1930. Serial No. 460,367.

The present invention relates to truck bodies for use in transporting cylindrical containers, particularly cylinders such as are employed for carrying compressed gases.

Cylinders containing compressed gases are usually fitted with safety valves, but the valves sometimes fail, and in that case an excess of pressure can be built up, due, for instance, to the heat of the outside atmosphere. In these circumstances there can occur an explosion of a particularly disastrous character. Such explosions are liable to be precipitated by a sharp blow upon the cylinder, such as would result from the cylinder falling against the floor or a wall of the truck transporting it, or from one cylinder falling against another. The main object of my invention is to provide a truck body by means of which the containers are retained in position in such a manner that they are not subjected to severe impacts during transit, either by striking against each other or against parts of the vehicle, and into or out of which the containers can nevertheless be loaded or unloaded easily and conveniently.

A truck body constructed in accordance with my invention, together with several modified arrangements thereof, is described, by way of example, in the following specification and shown in the accompanying drawings, in which:

Fig. 2 is a plan of a portion of such truck body;

Fig. 3 is an end view of the parts shown in Fig. 2; and

Figure 1:
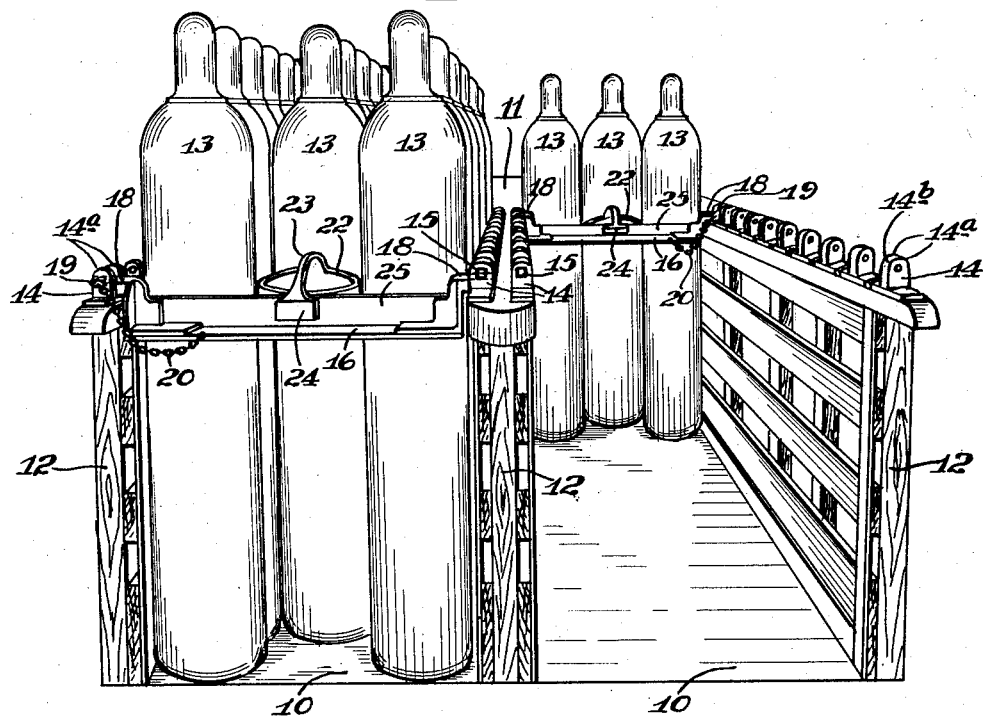
Fig. 1 is a perspective view of a truck body constructed in accordance with my invention, as seen from the rear.

Referring now to Figs. 1 to 3, which show one arrangement of my improved truck body which has been found very convenient in use, the body includes a floor 10, a transverse front wall 11 and three longitudinally extending walls 12, two of which constitute the sides of the truck body and the other of which constitutes an intermediate partition. The longitudinal walls 12 are spaced from each other by distances substantially equal to multiples of the diameters of the containers (indicated at 13) to be transported, such distances, in the construction shown in Figs. 1-3, being sufficient to enable the containers 13 to be arranged snugly side by side in rows of three. Thus there is no opportunity for lateral displacement of the containers when the rows are complete.

Each of the outer walls 12 is provided with one, and the center wall 12 with two, rows of sockets 14. The individual sockets of these rows are spaced apart by a distance substantially equal to the diameter of one of the containers 13, and each socket is formed with a pair of ears 14a spaced so as to provide between them a slot 14b. Certain of the rows of sockets (in the example shown in Figs. 1 to 3, the two rows on the intermediate longitudinal wall 12) have rods 15 extending through the ears 14a of all the sockets of the row, such rods operating to close the top ends of the slots 14b of the sockets.

The arrangement shown in Figs. 1 to 3 presents two aisles for the reception of the containers 13. For each aisle I provide a retaining cross bar 16 having at its ends upwardly extending brackets 17 formed with tongues 18 projecting outwardly therefrom. Each cross bar is of such dimensions (depending upon the width of the aisle in which it is to be used) that the tongues 18 will enter the slots 14b of the sockets on each side of the aisle, the retaining bar being thereby secured in position. In placing the retaining bar in position, one of the tongues 18 thereof is inserted in the slot 14b of one of the sockets carried by the intermediate wall 12, beneath the rod 15. The opposite end of the retaining bar is then swung down so that the tongue 18 at that end enters the slot of the socket on the side wall 12, being secured therein by a pin 19 passing through suitable holes in the ears 14a of the socket. The pin 19 is preferably attached to the retaining bar by a chain 20, so as to prevent loss, and is provided with a pivoted latch 21 which can be turned at right angles to the pin (Fig. 2) when the latter has been passed through the holes in the ears 14a, thereby preventing accidental disconnection of the pin.

It will be seen that by my invention the containers 13 may be stacked on end in rows in the truck, and the retaining bars then placed in position to hold in place the rearmost rows in the aisles. Thus the containers are secured in position in such a manner that they cannot fall with any force against each other or against any part of the truck. Nevertheless the containers may be unloaded very conveniently, all that is necessary being that the retaining bar 16 at one end of an aisle be removed and replaced farther forward in the aisle after the containers have been unloaded. It is not essential that the rows of sockets 14 extend the whole length of the walls 12, as when the aisles have become partly emptied, the contents thereof can be shifted as a whole towards the rear of the truck, being then maintained in position by retaining bars engaging the front row like those engaging the rear row.

On some occasions, for example when some have been unloaded for delivery to a consumer, the number of containers in an aisle will be such that the rearmost row is not complete. To prevent material movement of the containers in these conditions, I provide dummies, of which a plurality may be carried on the truck, available for employment if and when required. One of such dummies is shown in use in each aisle in Figs. 1 to 3. Each dummy comprises a ring 22 of a diameter corresponding with that of the containers 13, such ring being provided with a handle portion 23 and a hook portion 24 which is spaced away from the side of the ring 23 by a distance corresponding to the thickness of an upwardly extending web 25 with which the retaining bar 16 is provided. A dummy can be mounted in position on the retaining bar 16 by hooking the hook portion 24 thereof over the web 25 of the retaining bar, such web then being enclosed between the hook portion 24 and the ring 22. The dummies are very easily placed in position and removed, and as many of them may be used as there are vacancies in the last row of the containers. By this means, whatever the number of containers that is being transported at any time in an aisle of the truck, the containers are securely and firmly supported in such a way that there can be no material impacts between themselves or against parts of the truck.

Figure 4:
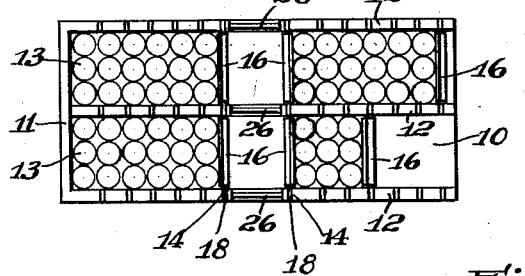
Figs. 4, 5 and 6 are schematic views showing several alternative arrangements of the truck body.
Figure 5:
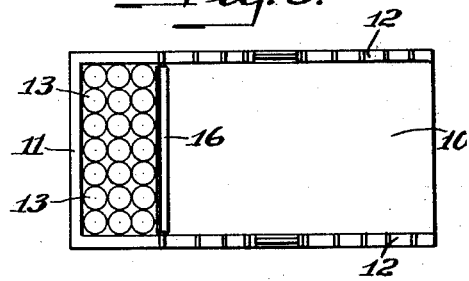
Figure 6:
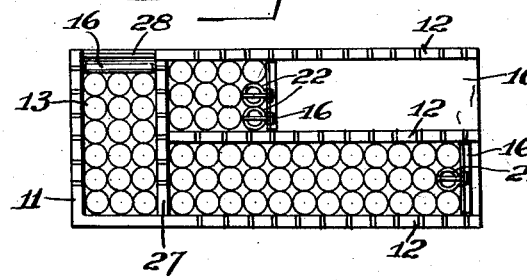

The manner in which the walls and loading openings of truck bodies embodying my invention may be arranged is susceptible of wide variation. Three of the numerous possible arrangements other than that shown in Figs. 1 to 3 are illustrated in Figs. 4, 5 and 6 of the drawings. In Fig. 4 there is shown an arrangement in which the walls 12 are provided with gates 26 intermediate their ends, permitting loading or unloading at the sides of the truck as well as at the rear end. In such a case retaining bars might be employed to close the portions of the aisles in front of the gates 26 and other retaining bars employed to close both ends of the aisles at the rear of the gates 26. This would be of advantage in some cases, as dividing the truck into four compartments, each of which compartments might be loaded with containers holding a particular compressed gas, thereby rendering any one of the several kinds of gas quickly available. Fig. 5 shows an arrangement similar to Fig. 4 but in which no intermediate wall 12 is employed, the truck not being divided into aisles. In Fig. 6 is illustrated an arrangement in which a transverse wall 27 is arranged at a suitable distance behind the front end wall 11 of the truck body so as to provide a transverse aisle which is closed by a side gate 28, the retaining bars being, of course, disposed transversely of this aisle. The back portion of the truck body is divided into two aisles like those described above in connection with Figs. 1 to 3. One or the other of these and other possible arrangements may be employed, depending upon the conditions in which the truck is to be used, and what is found convenient under the particular circumstances. The arrangements permitting of side loading and unloading are sometimes of especial convenience, as also, upon occasion, are those permitting separation of containers holding different gases.

I claim:

1. In a truck body for transporting cylindrical containers of uniform diameter, the combination with a pair of members for confining a plurality of said containers in rows between them, a series of sockets mounted on each of said members, the individual sockets of each series being spaced apart by a distance substantially equal to the diameter of a container, and a retaining bar for engagement with an end row of said containers and adapted to be inserted between said members to enter one or another pair of said sockets in accordance with the position of the end row of containers; of a dummy of a width substantially equal to the diameter of said containers, said dummy having a hook for detachably mounting it upon said retaining bar.

2. In a truck body for transporting cylindrical containers of uniform diameter, the combination with a pair of members for confining a plurality of said containers in rows between them, a series of sockets mounted on each of said members, the individual sockets of each series being spaced apart by a distance substantially equal to the diameter of a container, and a retaining bar for engagement with an end row of said containers and adapted to be inserted between said members to enter one or another pair of said sockets in accordance with the position of the end row of containers, said retaining bar being provided with an upwardly extending web; of a dummy detachably connected with said retaining bar and comprising a ring of a diameter substantially the same as that of said containers and a hook spaced from said ring for the admission of the web of said retaining bar.

In testimony whereof, I sign my name.

WILLIAM G. MAYER.